(No Model.)　　　　　　　　　　　　　　　　6 Sheets—Sheet 1.
G. L. THIELL.
DRAFT REGULATING APPARATUS FOR FURNACES.

No. 526,419.　　　　　　　　Patented Sept. 25, 1894.

WITNESSES
Dan'l Fisher
Geo. E. Taylor

INVENTOR
George L. Thiell,
by Geo. W. T. Howard,
Attys.

(No Model.) 6 Sheets—Sheet 2.

G. L. THIELL.
DRAFT REGULATING APPARATUS FOR FURNACES.

No. 526,419. Patented Sept. 25, 1894.

WITNESSES
Dan'l Fisher
Geo. E. Taylor

INVENTOR
George L. Thiell,
by [signature]
Atty.

(No Model.)  6 Sheets—Sheet 4.

G. L. THIELL.
DRAFT REGULATING APPARATUS FOR FURNACES.

No. 526,419. Patented Sept. 25, 1894.

WITNESSES
Dan'l Fisher
Geo. E. Taylor

INVENTOR
George L. Thiell,
by W. T. Howard,
atty.

(No Model.)

G. L. THIELL.
DRAFT REGULATING APPARATUS FOR FURNACES.

No. 526,419.  Patented Sept. 25, 1894.

6 Sheets—Sheet 5.

(No Model.) 6 Sheets—Sheet 6.

G. L. THIELL.
DRAFT REGULATING APPARATUS FOR FURNACES.

No. 526,419. Patented Sept. 25, 1894.

WITNESSES
Dan'l Fisher
Geo. E. Taylor

INVENTOR
George L. Thiell,
by Geo. W. Howard,
Atty.

UNITED STATES PATENT OFFICE.

GEORGE L. THIELL, OF BALTIMORE, MARYLAND, ASSIGNOR TO THE THIELL COMBUSTION GOVERNOR AND MANUFACTURING COMPANY OF BALTIMORE CITY, OF MARYLAND.

DRAFT-REGULATING APPARATUS FOR FURNACES.

SPECIFICATION forming part of Letters Patent No. 526,419, dated September 25, 1894.

Application filed December 10, 1892. Renewed February 27, 1894. Serial No. 501,728. (No model.)

*To all whom it may concern:*

Be it known that I, GEORGE L. THIELL, of the city of Baltimore and State of Maryland, have invented certain Improvements in Draft-Regulating Apparatus for Furnaces, of which the following is a specification.

This invention relates, first, to the combination of a combustion regulating device such as is shown and described in my Letters Patent, No. 490,177, dated January 17, 1893, with a steam damper regulator. In the union of the combustion and steam regulators, the operation of the former is not in any manner controlled or affected by the latter, except when the pressure of steam in the boiler shall have reached a prearranged height say one hundred pounds pressure to the square inch, in which case the damper is suddenly closed; or when the said steam pressure shall have fallen below a prearranged minimum point say ten pounds to the square inch, when the damper is suddenly opened, and held open independently of the combustion regulating apparatus until the steam pressure is again raised. Between the two extreme pressures, the steam damper regulator is inoperative and the combustion regulator has full control of the furnace.

The second part of the present invention relates to the construction of the mechanism employed to effect the results above briefly described, and also to the construction of the steam damper regulator itself, all of which will hereinafter fully appear.

In the further description of the said invention which follows, reference is made to the accompanying drawings forming a part hereof and in which—

Figure 1:
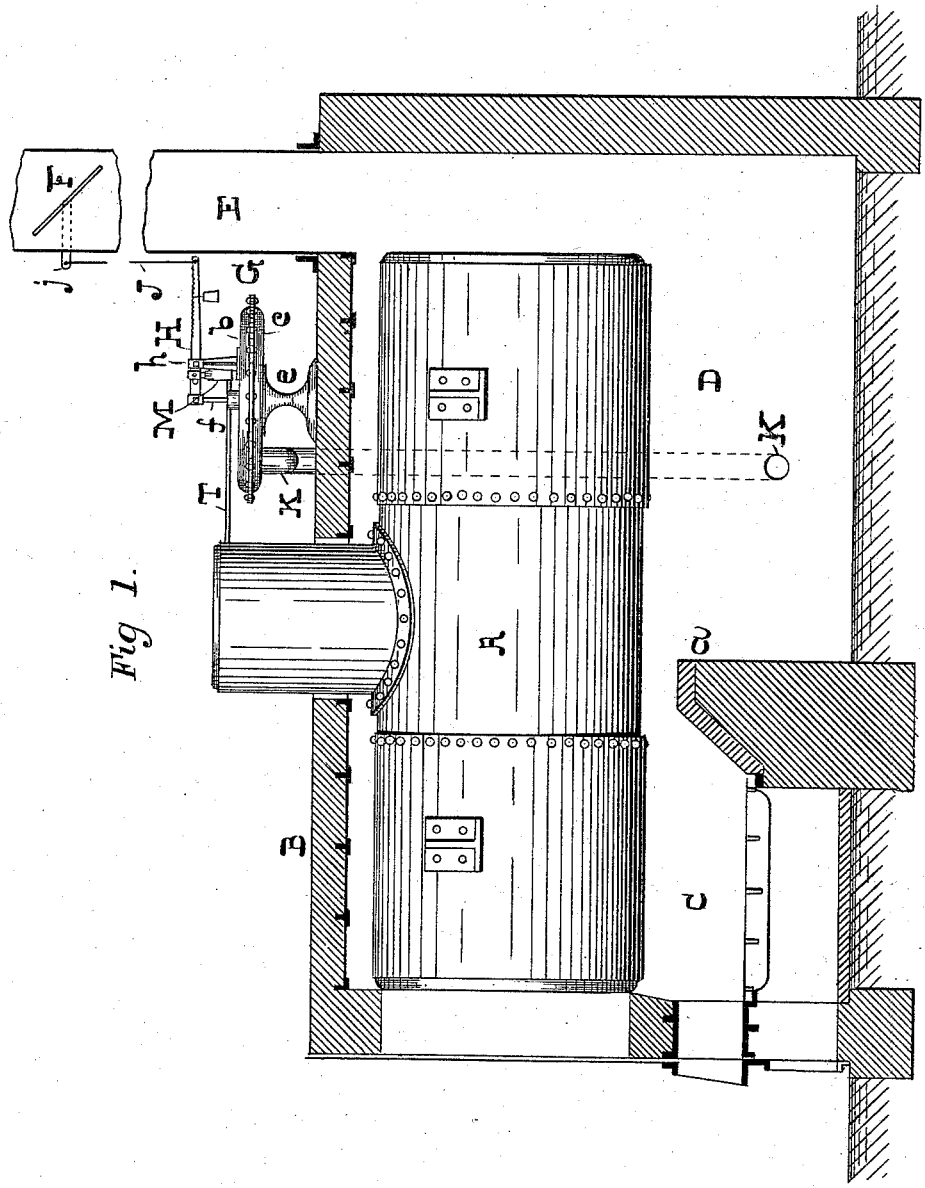
Figure 2:
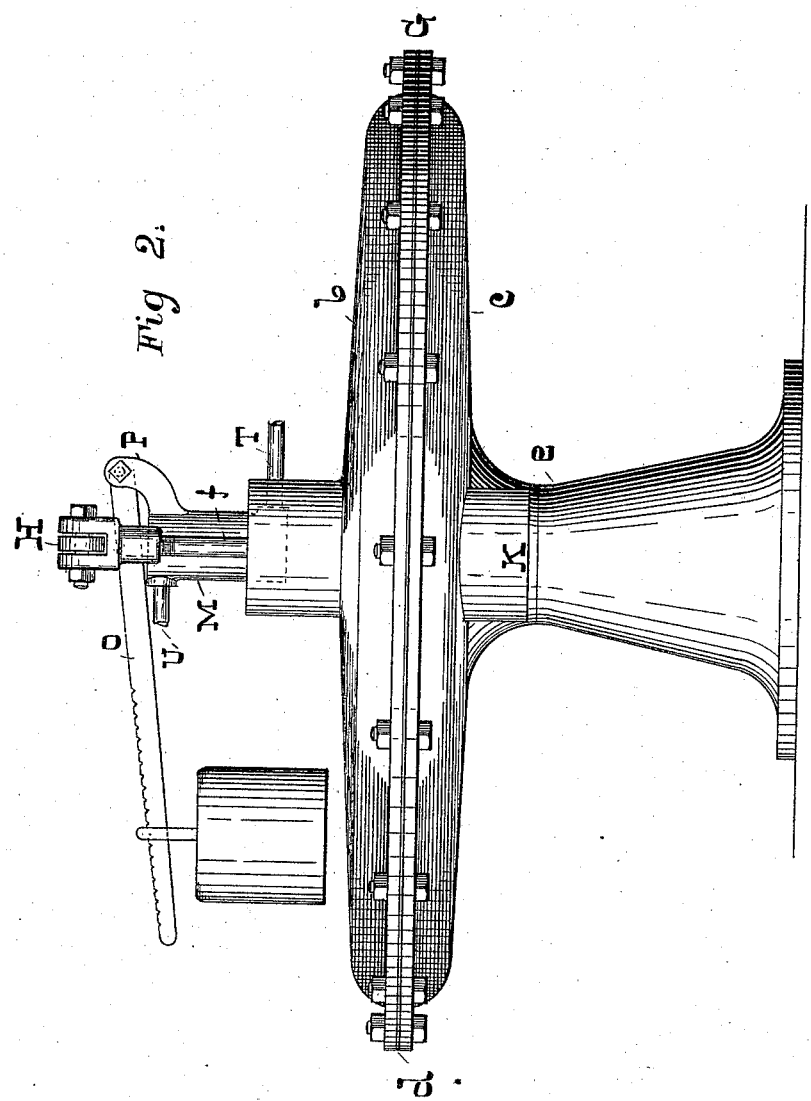
Figure 3:
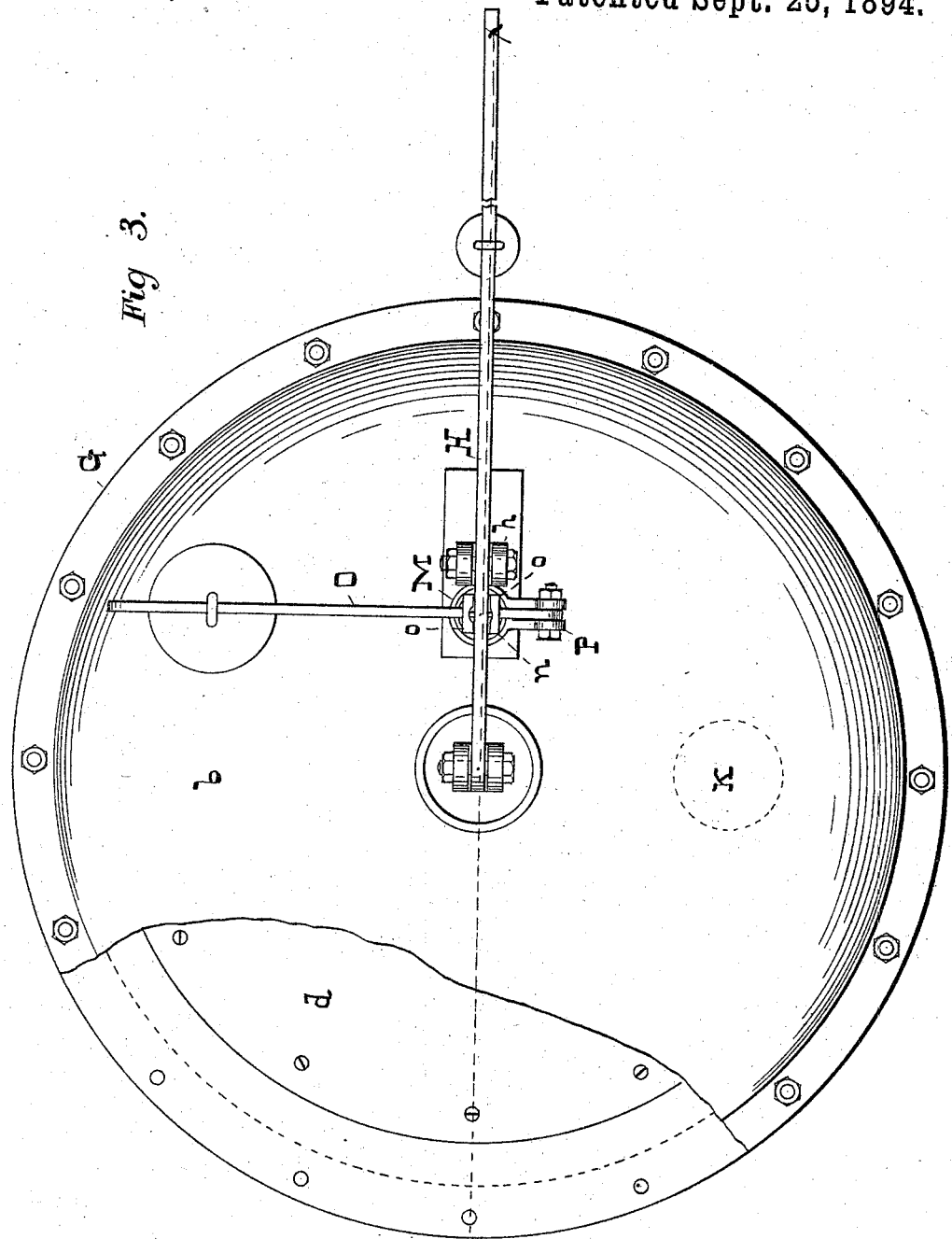
Figure 4:
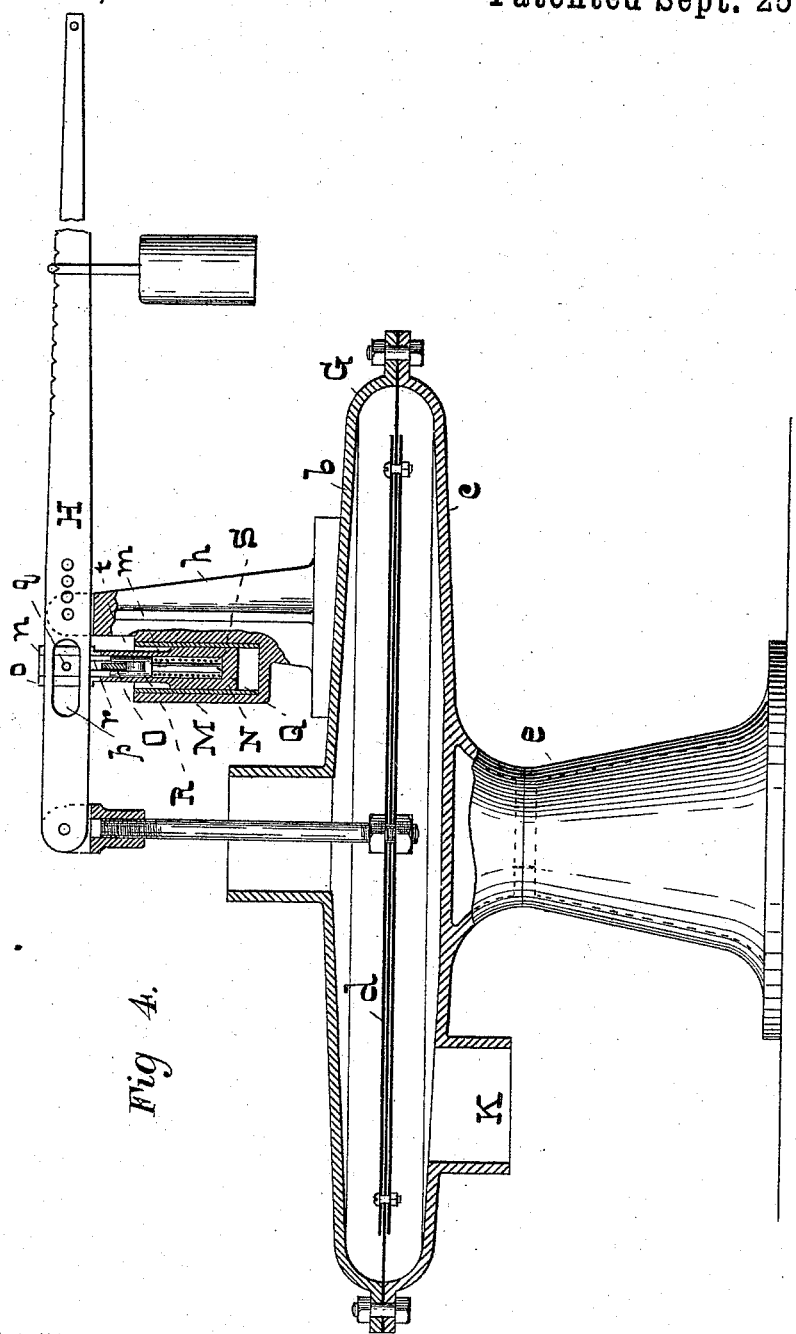
Figure 5:
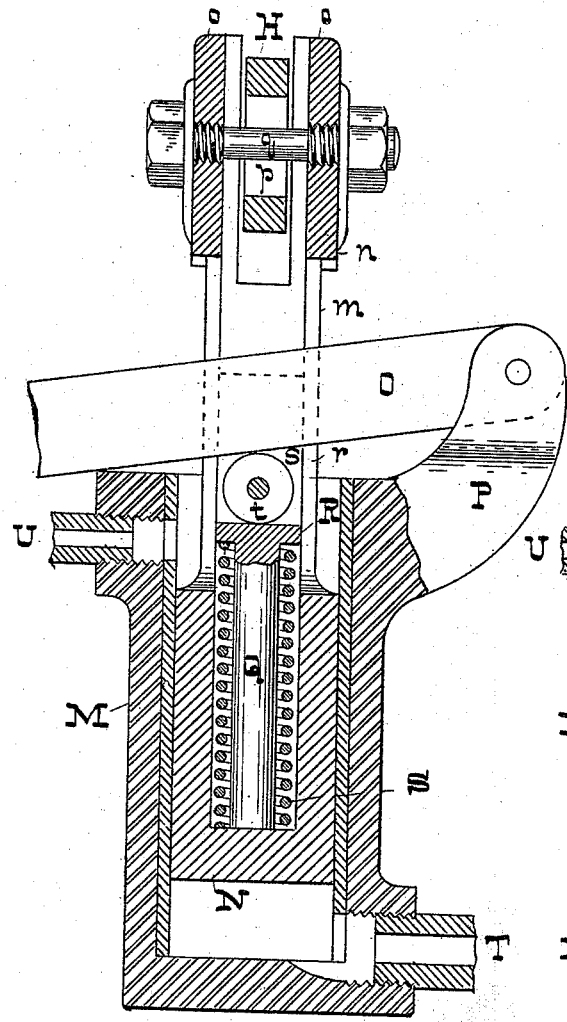
Figure 6:
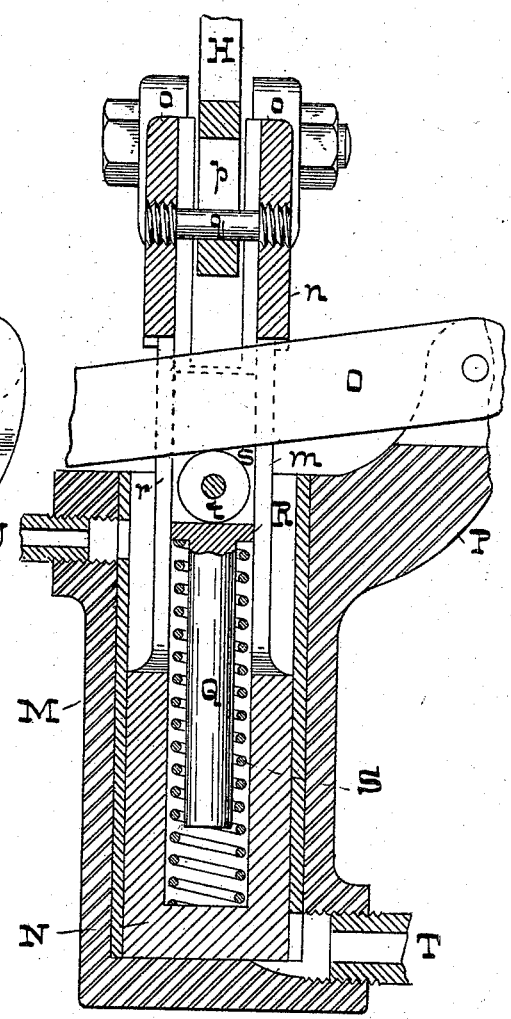
Figure 7:
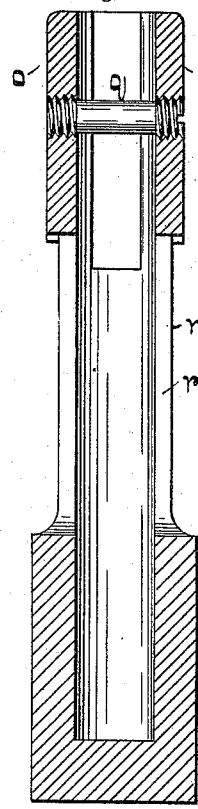
Figure 8:
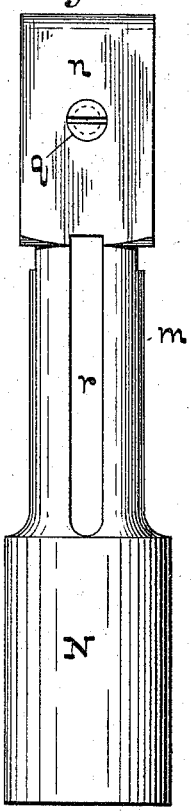
Figure 9:
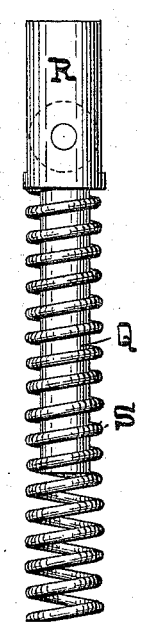
Figure 10:
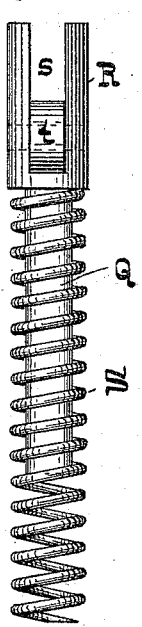
Figure 11:
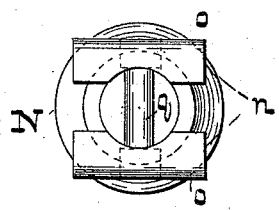
Figure 12:
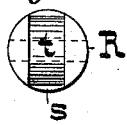

Figure 1 is a longitudinal section of a boiler and its brick-work setting, together with the damper regulating mechanism forming the subject of the present invention. Fig. 2 is an exterior side view of the improved apparatus and Fig. 3 a plan of the same with a portion thereof removed. Fig. 4 is a partly sectional view of Fig. 3 taken on the dotted line $x$—$x$. Figs. 5 to 12, inclusive, are details of the invention on an enlarged scale.

Referring to the drawings, A is a boiler, and B the brick-work setting.

C is the furnace and D the combustion chamber or smoke box, separated from the furnace by the bridge wall $a$.

E is the stack or chimney in which is swung the damper F.

G is a circular box consisting of the upper and lower sections, represented respectively by $b$ and $c$. The sections $b$ and $c$ are flanged where they are united, and between the flanges is secured a flexible diaphragm $d$ impervious to air and preferably formed of sheet rubber, or duck rendered air proof by treatment with some suitable varnish.

The lower section $c$ of the box G is provided with a stand $e$ whereby it is supported from the top of the boiler setting, or from any other fixed body adjacent to the furnace and chimney.

To the upper face of the diaphragm $d$ and centrally thereof, is attached a rod $f$ which leads through an opening in the upper section $b$ of the box G, and is jointed to a horizontal weighted lever H having its fulcrum in a stand $h$. The end of the long arm of the weighted lever H is connected by a link J to the end of the damper lever $j$.

The lower section of the box G is in communication with the interior of the combustion chamber D by means of a pipe K, and the upper section $b$ is in communication with the outer air through the medium of the annular opening around the rod $f$.

The weight on the lever H is to counterbalance the diaphragm and its connections.

The movement of the damper is effected by any change in the relative pressures of the gases in the combustion chamber and furnace, and the atmospheric air, as fully set out and described in the said patent, No. 490,177.

So far as is described, the movement of the damper is effected only by change in the conditions of the gases in the furnace and combustion chamber, and the apparatus is arranged so as to maintain a condition of the gases which represents nearly perfect combustion of the fuel used, but it is evident that the combustion regulator cannot limit the quantity of coal introduced into the furnace, and with excessive firing the steam may rise to a pressure much greater than that required. It is to obviate this excessive rise in steam pressure, and make the apparatus wholly automatic in controlling the fire and steam pressure, that the combination of the combustion regulator and steam regulator before alluded to, is employed.

M is a steam cylinder cast as a part of, or attached to the stand h. This cylinder is bushed with brass to prevent internal corrosion and reduce friction of the piston N therein. The piston N is hollow and has a hollow stem m leading from its upper side or face. The top of the hollow stem m is formed into a branched head n between the two parts or jaws o of which the lever H is situated. The lever H at this point has a wide slot p and the branched head n is fitted with a transverse pin q considerably smaller than the slot p in the arm of the lever through which it passes. The difference in size of the slot in width, and the pin in diameter, admits, when the said pin is central of the slot, considerable independent movement of the lever H, or sufficient movement of the said lever to admit of the opening and closing of the damper without the pin q striking either side of the slot. The hollow stem has a slot r which is at a right angle with the slot or space between the two parts of the branched head n. Through this slot r extends a weighted lever O the fulcrum of which is in a bracket P projecting from the cylinder M.

Q is a solid stem situated in the hollow stem m the end of which is adapted, under circumstances hereinafter described, to pass to the bottom of the piston N, and its upper end is provided with a slotted head R. At the bottom of the slot s is an antifriction roller t upon which the weighted lever O rests.

S is a spring coiled about the solid stem Q and confined endwise between the under side of the head of the said stem, and the bottom of the hollow piston N.

T is a pipe leading from near the bottom of the cylinder M to the steam space of the boiler. Another pipe U serves to carry off any water of condensation which may accumulate in the steam cylinder above its piston.

Supposing that the steam damper regulating apparatus described, is taken away, the movement of the diaphragm effected by changes in the relative pressures of the gases in the combustion chamber, and the atmosphere, controls the movement of the damper, as fully described in the said patent; but it will be understood that the said apparatus does not place any limit on the generation of steam, but merely controls the position of the chimney damper so as to effect the greatest economy in consumption of the fuel used. It will also be understood that when steam is let off the boiler, the damper is closed, and before fire can again be started the damper has to be opened by hand by first detaching some of the connections between the diaphragm and the damper lever, and maintaining the dislocation of the parts until the fire is in a normal condition. Supposing now that the steam damper regulating apparatus described, is in use in connection with the combustion regulator, and that the boiler is cold and fire to be started, there being no pressure of steam to support the piston N in the cylinder M and overcome the resilient action of the spiral spring S, the said spring drives the piston N to the bottom of the cylinder, or to its lowest possible position in the cylinder (see Fig. 6) and the pin q in the head n coming in contact with the lower side of the slot p in the short arm of the lever H that arm is drawn down and the long arm being elevated, the damper is opened, independently of the diaphragm and its connections. As soon as steam in the boiler rises to a pressure of ten pounds per square inch, the tension of the spiral spring S is overcome and the same compressed by the piston which rises until its bottom strikes the lower end of the solid stem Q which is held by the weighted lever O. This action of the piston carries the pin q to the center of the slot p in the lever H, and that lever being now free of, or disconnected from, the steam regulating device, the damper is controlled entirely by the operation of the diaphragm. This condition of the various parts of the invention is maintained until the steam pressure in the boiler rises to one hundred pounds to the square inch, when the piston N, which at this time is in contact with the bottom of the stem Q, overcomes the weighted lever O, and ascends bringing the pin q against the upper side of the slot p on the lever H, thereby raising the short arm and lowering the long arm which latter closes the damper. The draft being now cut off, the steam pressure falls, and as soon as the lever O again brings the piston to its second or central position in the steam cylinder, or that shown in Fig. 5, the combustion regulator alone controls the position of the damper.

From the foregoing description it will be seen that the steam damper regulator is inoperative except when the steam in the boiler falls to ten pounds, or rises to one hundred pounds pressure, but at either of these extremes of pressure, it becomes operative and controls the damper independently of the combustion regulator.

I claim as my invention—

1. In combination with a damper regulator in which movement of the damper is effected by a diaphragm one side of which is acted on by the gases in the furnace and the other by the atmosphere, substantially as described, a steam regulating apparatus for the said damper, substantially as specified.

2. In combination with a lever deriving its movement from a diaphragm having one side thereof acted on by the gases in the combustion chamber or the furnace of a boiler, and the other by the atmosphere, and which lever is adapted to impart its movement to the damper in a chimney leading from the said combustion chamber or furnace, a cylinder in communication with the steam space of the boiler, a piston in the cylinder, a weighted lever to retain the said piston in a partially depressed position in the said cylinder, a spring to yieldingly hold the said piston in its lowest position, and means to connect the said piston with the said primary lever, whereby the piston communicates motion to the said lever only on approaching its highest or lowest positions within the said steam cylinder, substantially as specified.

3. In combination with the lever H having the slot $p$, the steam cylinder M, piston N having a stem with a pin smaller than the slot $p$ through which the said pin passes, the inner stem Q, a spring coiled about the said inner stem, and the weighted lever O, substantially as, and for the purpose specified.

4. In combination with a boiler furnace, a damper therefor, two damper regulators adapted to operate said damper, one deriving its movement from gases in the combustion chamber, and the other from steam in the boiler, substantially as specified.

GEORGE L. THIELL.

Witnesses:
WM. T. HOWARD,
DANL. FISHER.